(12) United States Patent
Nistor et al.

(10) Patent No.: US 9,785,536 B2
(45) Date of Patent: Oct. 10, 2017

(54) CODE INJECTION FOR CONDITIONAL BREAKPOINTS

(71) Applicants: Mihail-Marian Nistor, Bucharest (RO); Dragos Miloiu, Banesti (RO)

(72) Inventors: Mihail-Marian Nistor, Bucharest (RO); Dragos Miloiu, Banesti (RO)

(73) Assignee: NXP USA, INC., Austin, TX (US)

( * ) Notice: Subject to any disclaimer, the term of this patent is extended or adjusted under 35 U.S.C. 154(b) by 0 days.

(21) Appl. No.: 15/036,234

(22) PCT Filed: Nov. 29, 2013

(86) PCT No.: PCT/IB2013/060513
§ 371 (c)(1),
(2) Date: May 12, 2016

(87) PCT Pub. No.: WO2015/079291
PCT Pub. Date: Jun. 4, 2015

(65) Prior Publication Data
US 2016/0299828 A1    Oct. 13, 2016

(51) Int. Cl.
*G06F 9/44*     (2006.01)
*G06F 11/36*    (2006.01)
*G06F 11/00*    (2006.01)
*G06F 9/45*     (2006.01)

(52) U.S. Cl.
CPC .............. *G06F 11/362* (2013.01); *G06F 8/30* (2013.01); *G06F 8/41* (2013.01); *G06F 11/3644* (2013.01)

(58) Field of Classification Search
CPC .. G06F 11/362; G06F 11/261; G06F 11/3648; G06F 8/41; G06F 11/3624; G06F 11/3644; G06F 21/10; G06F 21/572; G06F 21/71; G06F 8/30
See application file for complete search history.

(56) References Cited

U.S. PATENT DOCUMENTS

| | | | | |
|---|---|---|---|---|
| 6,016,555 A | * | 1/2000 | Deao | G06F 11/362 712/E9.032 |
| 6,077,312 A | * | 6/2000 | Bates | G06F 11/362 714/E11.21 |
| 6,112,298 A | * | 8/2000 | Deao | G06F 11/3636 712/227 |
| 6,931,631 B2 | * | 8/2005 | Bates | G06F 11/362 714/E11.209 |

(Continued)

FOREIGN PATENT DOCUMENTS

WO    WO2013-169767 A1    11/2013

OTHER PUBLICATIONS

Zhang et al., BPGen: an automated breakpoint generator for debugging, May 2010, 4 pages.*

(Continued)

*Primary Examiner* — Thuy Dao

(57) ABSTRACT

An apparatus for debugging operational code of a target program comprises a memory storing the operational code and a set of instructions representing a debugger program for debugging the operational code. A microprocessor is configured to execute the operational code and the debugger program. The debugger program can inject a jump to a breakpoint handling routine into the operational code and let a compiler program create code pieces for the breakpoint handling routine.

11 Claims, 9 Drawing Sheets

(56) References Cited

U.S. PATENT DOCUMENTS

| | | | | |
|---|---|---|---|---|
| 7,225,431 B2* | 5/2007 | Gschwind | ............ | G06F 11/362 |
| | | | | 712/1 |
| 7,428,727 B2* | 9/2008 | Alverson | ............... | G06F 11/362 |
| | | | | 714/34 |
| 8,312,434 B2* | 11/2012 | Bates | .................. | G06F 11/3624 |
| | | | | 717/124 |
| 8,806,447 B2* | 8/2014 | Bates | .................. | G06F 11/3624 |
| | | | | 717/124 |
| 9,292,414 B2* | 3/2016 | Kiel | .................... | G06F 11/3664 |
| 2005/0034024 A1 | 2/2005 | Alverson et al. | | |
| 2008/0010536 A1* | 1/2008 | Bates | .................. | G06F 11/3644 |
| | | | | 714/38.13 |
| 2012/0254666 A1 | 10/2012 | Liu | | |
| 2013/0254750 A1 | 9/2013 | Tepus | | |
| 2013/0318504 A1 | 11/2013 | Eker et al. | | |

OTHER PUBLICATIONS

Park et al., Concurrent breakpoints, Aug. 2012, 2 pages.*
International Search Report for the International application No. PCT/IB2013/060513 dated Aug. 27, 2014.

* cited by examiner

CODE INJECTION FOR CONDITIONAL BREAKPOINTS

FIELD OF THE INVENTION

This invention relates to field of software debugging.

BACKGROUND OF THE INVENTION

A debugger program, or debugging tool, is a computer program that is used to test and debug another program (the "target" program), and which allows to run in a controlled manner the target program and analyse the run-time behaviour thereof. A debugger program typically runs on an apparatus comprising a memory storing the target program and a set of instructions representing the debugger program and one or more microprocessors configured to execute the target program and the debugger program. Depending on the specific implementation, the debugger may be executed by the same microprocessor and memory as the target program, or be executed on a separate microprocessor and memory. The latter case can e.g. be used to debug embedded systems, by connecting a microprocessor system which runs the debugger program to the embedded system which runs the target program in a manner that the debugger program controls the execution of the target program.

A user, such as a computer programmer, can use the debugger program to set certain breakpoints for analysing the behaviour of the target program. A breakpoint is an intentional suspension or pausing the execution of the target program at a certain position in the target program, put in place for debugging purposes. If the execution of the target program is suspended, the target program is said to be in "break mode". When in break mode, the state of the target program remains, and execution can be continued upon exiting break mode. Since the state of the target program is preserved when the target enters in break mode, the state can be inspected, e.g. by verifying the content of general purpose registers, memory, logs, files, etc., to find out whether the target program is functioning as expected.

A conditional breakpoint is a breakpoint which occurs if one or more predefined conditions are satisfied at the position specified by the breakpoint, such as starting execution of a programmer-specified instruction in the target program at the position or reading, writing, or modification of a specific location in an area of memory at the position. A conditional breakpoint consists of one or more conditions that determine when a program's execution should be interrupted.

The standard approach for handling a conditional breakpoint is that upon arriving at the position in the target program specified by the breakpoint, the target program is paused and the debugger program evaluates the condition associated with this breakpoint. If the condition is false, the debugger program will resume the execution of the target program. If the condition is true, the debugger program does not resume the execution and presents the current state to the to a human being through a suitable man-machine interface of to another pogram such as a software analysis program.

However, this standard approach has a very low processing speed for the conditional breakpoints, and may alter the behaviour for real-time applications. The standard approach will also introduce large delays in the execution of the target program if the position of the breakpoint is inside a loop (software or hardware), interrupt handler, inline function, or any code that is executed multiple times.

SUMMARY OF THE INVENTION

The present invention provides apparatuses, methods and computer programs as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the FIGs., elements which correspond to elements already described may have the same reference numerals.

DETAILED DESCRIPTION OF THE PREFERRED EMBODIMENTS

Figure 9:
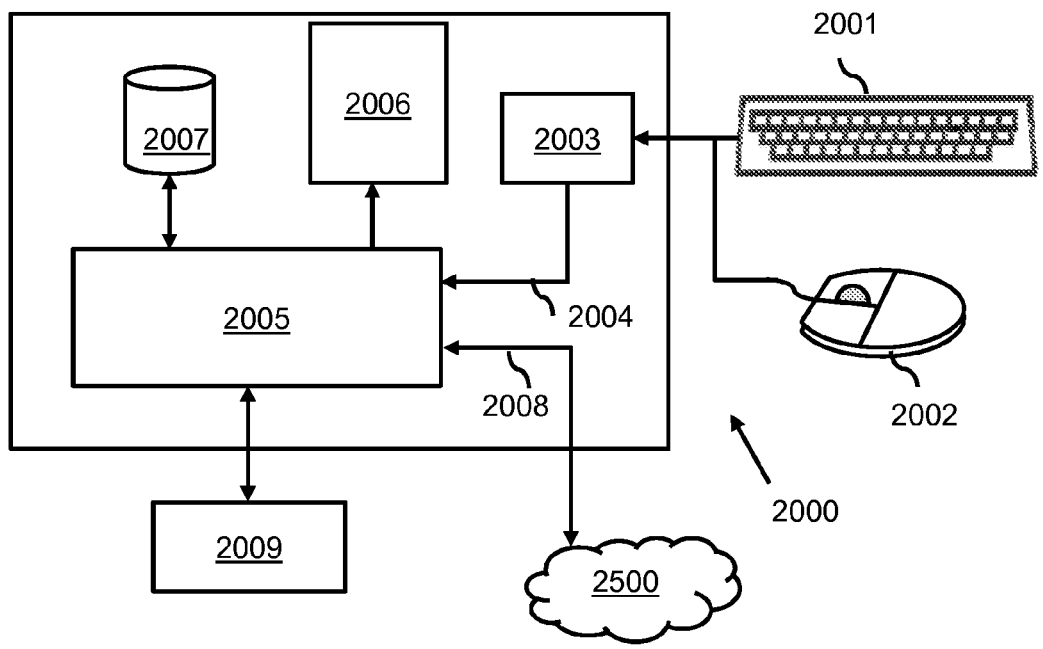
FIG. 9 schematically shows an example of a microprocessor system.

For the sake of understanding by a software programmer, the example of FIG. 1 will be described in terms of the architecture of the debugger program, and its functionality. However, it will to be apparent that the "program," as used herein, is a sequence of instructions designed for execution on a microprocessor system, i.e. an apparatus comprising a memory storing the instructions and a microprocessor configured to execute the instructions. Accordingly, any actions described as performed by the program are operations performed by the microprocessor system when executing the sequence of instructions. A program, or computer program, may e.g. include a subroutine, a function, a procedure, an object method, an object implementation, an executable application, an applet, a servlet, a source code, an object code, a shared library/dynamic load library and/or other sequence of instructions designed for execution on a microprocessor system. An example of a microprocessor system is shown in FIG. 9, and will be described herein further below in more detail.

Figure 1:
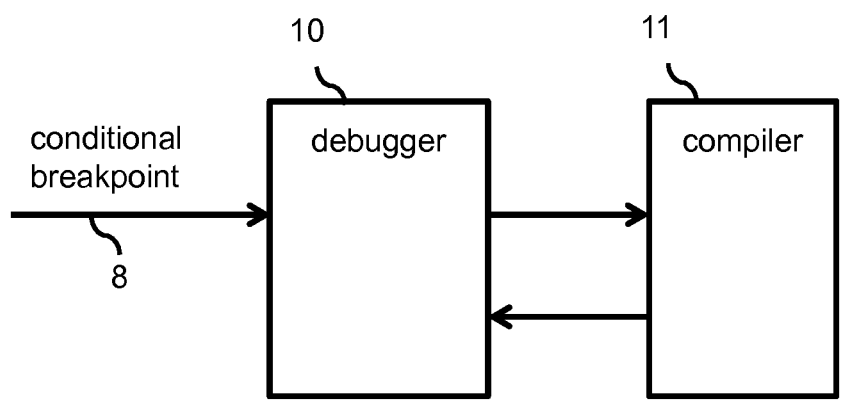
FIG. 1 schematically shows an example of an embodiment of a debugger program and a compiler program.

FIG. 1 schematically shows a debugger program 10 for debugging operational code of a target program according to an embodiment, and a compiler program 11 according to an embodiment. The debugger program 10 is arranged to receive a conditional breakpoint 8 from e.g. a user or a software analysis program (not shown). The debugger program is arranged to call the compiler program 11 to instruct the compiler program 11 to generate code pieces for a special breakpoint handling routine as will be described below.

Figure 2:
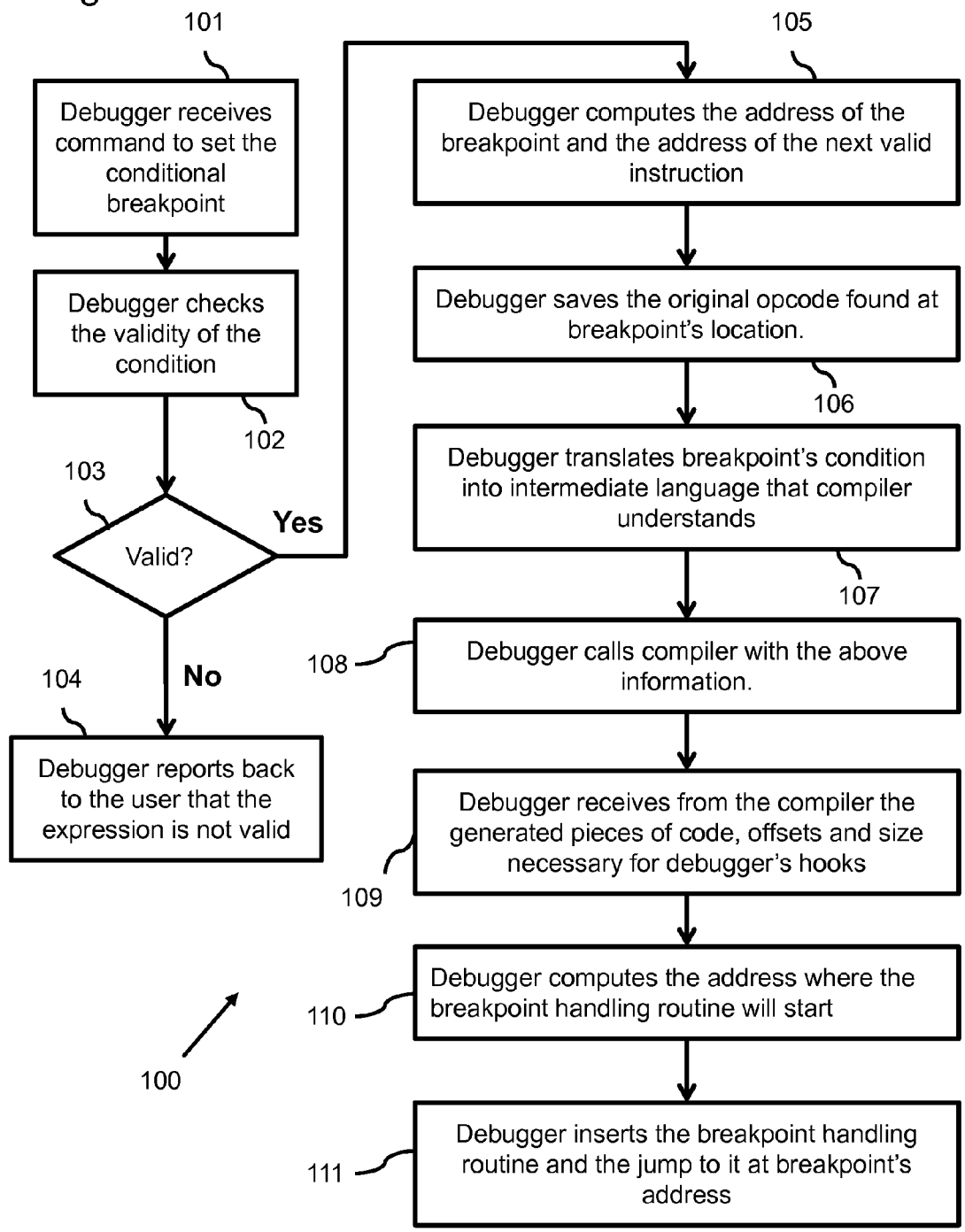
FIG. 2 shows a flow chart of an example of a method of debugging operational code of a target program according to an embodiment.

FIG. 2 shows a flow chart of an example of a method 100 of debugging operational code of a target program. The example of FIG. 2 may be performed by the debugger program in cooperation with the compiler program.

The method 100 is started once a conditional breakpoint (BP) is set using the debugger program, e.g. by a human being through a suitable man-machine interface of by another pogram such as a software analysis program. The debugger program receives a command to set the conditional breakpoint, see ref. number 101, and next the debugger program will check the validity of the condition set by the by a human being through a suitable man-machine interface of by another pogram such as a software analysis program, see 102. The command comprises a position of the breakpoint, such as the location within a code file (e.g. C++ source code file) and the name of the code file. The command will also comprise a condition defined by e.g. a by a human being through a suitable man-machine interface of by another pogram such as a software analysis program of the debugger entering an expression via a suitable input device (e.g. keyboard). If the condition is found to be invalid, see test 103, the debugger program will report back that the expression is invalid, see ref. number 104, and the method stops. The reporting back may be performed by showing an error message on a screen of a computer on which the debugger program is running, or in any other suitable way known to the skilled person. It is noted that the debugger program can also receive a command to set a conditional breakpoint from e.g. a software analysis program, instead of from a a human being. In that case the reporting back of the error message may be a message to the software analysis program.

Figure 3:
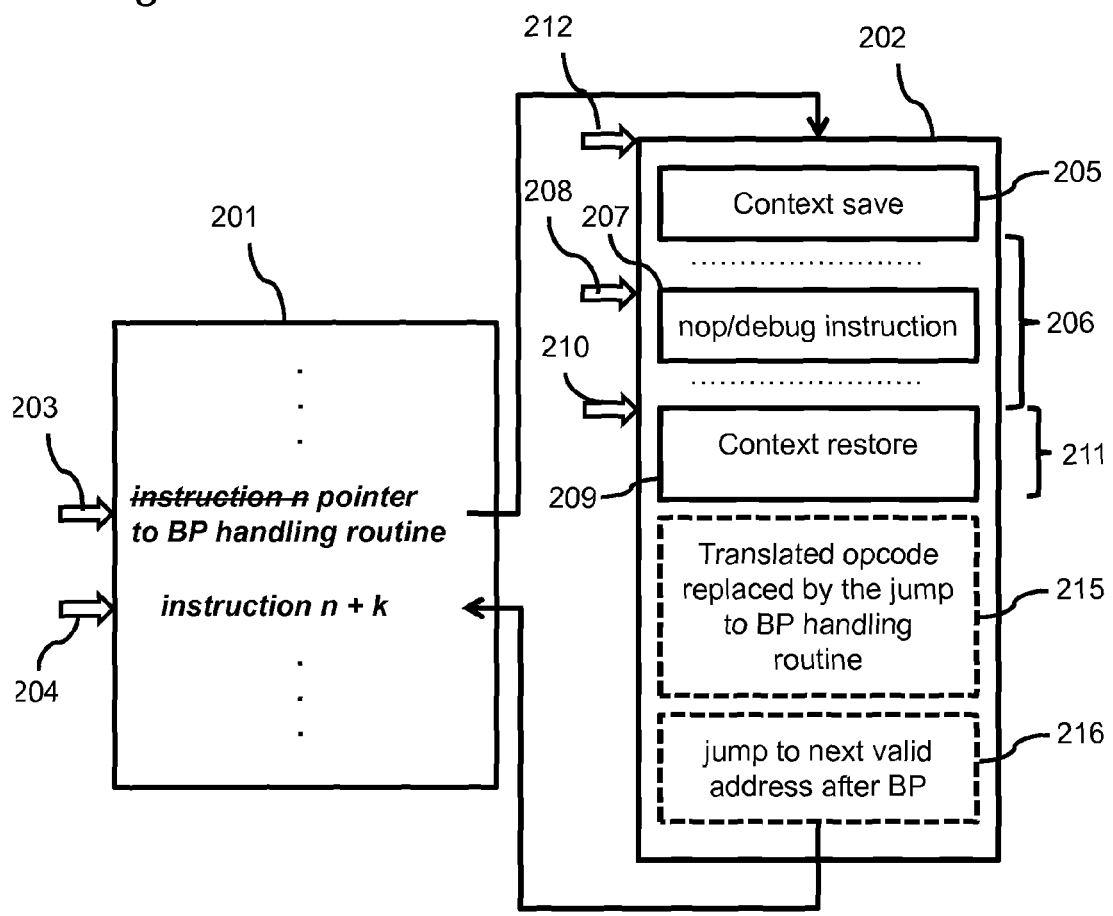
FIG. 3 schematically shows a first code block representing a part of an operational code of the target program to be debugged, and a second code block referred to a BP handling routine.

In the further discussion of FIG. 2, reference is also made to FIG. 3 which schematically shows a first code block 201 representing a part of an operational code of the target program to be debugged, and a second code block 202, also referred to a BP handling routine 202.

If in the test 103 of FIG. 2 the expression is valid, the method continues with an ref. number 105 in which the debugger program computes an address 203 of the breakpoint and an address 204 of a next valid instruction. The debugger program will inject a jump instruction to the BP handling routine at the address 203 of the breakpoint. Then, see ref. number 106, the debugger program saves the original opcode found at breakpoint's location 203.

The next valid instruction, see 'instruction n+k' in FIG. 3, may be that instruction following 'instruction n'. However there may be situations where the jump instruction is lengthier than the 'instruction n'. In such a situation the next valid instruction will be the first instruction not affected by jump insertion. There may also be a special case when the replaced instruction(s) has a delay slot. In this case the instruction(s) in the delay slot will also be moved into the breakpoint handling routine. So the next valid instruction will be the first instruction that is not part of a delay slot or part of the replaced instruction(s).

Next, the debugger program translates the breakpoint's condition into an intermediate language that the compiler program understands, see 107. Below an example of an intermediate language is given, using a simple C++ function:

```
void func (void)
{
int var1=1, var2=0;
....
for (int i = 0; i < 100; i++)
var2 += ++var1; // the user wants to set here a conditional BP by using
// the following expression: (var1 > 40) && (var2 < 30)
....
}
```

The debugger program knows the following information about these variables at the address where the user wants to set the breakpoint:

```
        var1:
        is located in memory at the 0x40000
        type of variable is "int"
        size of value is 4
        var2:
        is located in "R1" register
        type of variable is "int"
        size of value is 4
```

So an example of a breakpoint's condition translated into an intermediate language can be:

```
        (var1{location:0x40000, type:int, size:4} > 40) &&
        (var2{location:$R1, type:int, size:4} < 30)
```

As represented by ref. number 108, see FIG. 2, the debugger program calls the compiler program with the information computed (in the parts of the method indicated with ref. numbers 105, 106 and 107). The compiler program will now generate pieces of code, offsets 208, 210 and sizes 211 necessary for debugger program's hooks. This information is received by the debugger program, see ref. number 109.

As represented by ref. number 110, the debugger program will compute a memory address 212 of the start of the breakpoint routine 202, also referred to as routine memory address 212. It is noted that any memory management algorithm can be used to achieve this. Next, the debugger program inserts the breakpoint handling routine and the jump to it at the computed address 203 of the breakpoint, see ref. number 111.

As mentioned before, FIG. 3 schematically shows an example of a first code block 201 representing a part of the opcode of the target program to be debugged. This opcode could be generated by a compiler program, such as a C++ compiler program, and loaded into a memory, such as a random access memory. A second code block 202, also referred to a BP handling routine 202, comprises instructions to perform the breakpoint handling routine. As mentioned above, the debugger program computes the address of the breakpoint in the code block 201, see 203, and the address of a next valid instruction, see 204. The debugger program will inject (i.e. place) a jump instruction at the address 203 of the breakpoint. This injection is represented in FIG. 3 by striking through an 'instruction n', and replacing it by a 'pointer to BP handling routine'. The pointer to BP handling routine will point to a first instruction of the code block 202, this is indicated by the arrow pointing to the start of the BP handling routine 202.

The breakpoint handling routine 202 is created by the compiler program once it is called by the debugger program at ref. number 108, see FIG. 2. The compiler program may use a special template to construct the breakpoint handling routine 202.

In an embodiment, the breakpoint handling routine 202 comprises the following instructions. The breakpoint handling routine 202 starts with context save instructions 205 that will save the registers affected by the BP handling routine and any other information that the compiler program might need. The context save instructions 205 are followed by condition evaluation code 206 that evaluates the condition that the debugger program received from the user (or from another client of the debugger program, such as a profiler/software analysis program). It should be noted that in case of multi-core microprocessors sharing memory, the breakpoints may be in the shared memory, and in such cases the condition may also include a core identifier.

In an embodiment, the compiler program will provide an offset location 208 where the target program will stop if the condition is true. At that offset location 208, the compiler program may generate a debug instruction or a nop instruction, see 207. The debug instruction may be an assembly language instruction that places the core in debug mode, such as for example the "DEBUG" instruction for the StarCore architecture or the "BKPT" instruction for the ARM architecture. The "nop" instruction may be an assembly language instruction that effectively does nothing at all.

The compiler program may generate an assembly instruction similar to the debug instruction if the debug instruction in the core architecture, or, if the core architecture does not have a debug instruction, the compiler program may generate a "nop" instruction or any other instruction (all these instructions are used to reserve a space in code of the BP handling routine, see 207; the debugger program will use this space to insert the breakpoint). If the "nop" instruction is generated, the debugger program will then insert a breakpoint at that location so as to make sure that the target program will be stopped (i.e. the core will be placed in debug mode) when the location 208 is reached. Please note that the exact place of the nop or debug instruction 207 within the condition evaluation code 206 is depending on the way the compiler program produces the whole condition evaluation code 206.

The condition evaluation code 206 is followed by a context restore code 209 for restoring the context saved by save context instructions 205, so as to revert any changes done by the BP handling routine. In an embodiment the compiler program also provides the offset 210 where the context restore code begins and the size of this code, see 211. After the context restore code 209, the opcode of the code block 201, which was replaced by the jump to the BP handling routine 202, is inserted, see 215. In some special cases this opcode should first be modified (e.g. a relative branch or short branch should be converted/translated to a long branch). The BP handling routine 202 ends with a jump to the next valid address, i.e. the address 204 of the next valid instruction being instruction n+k in this example.

Figure 4:
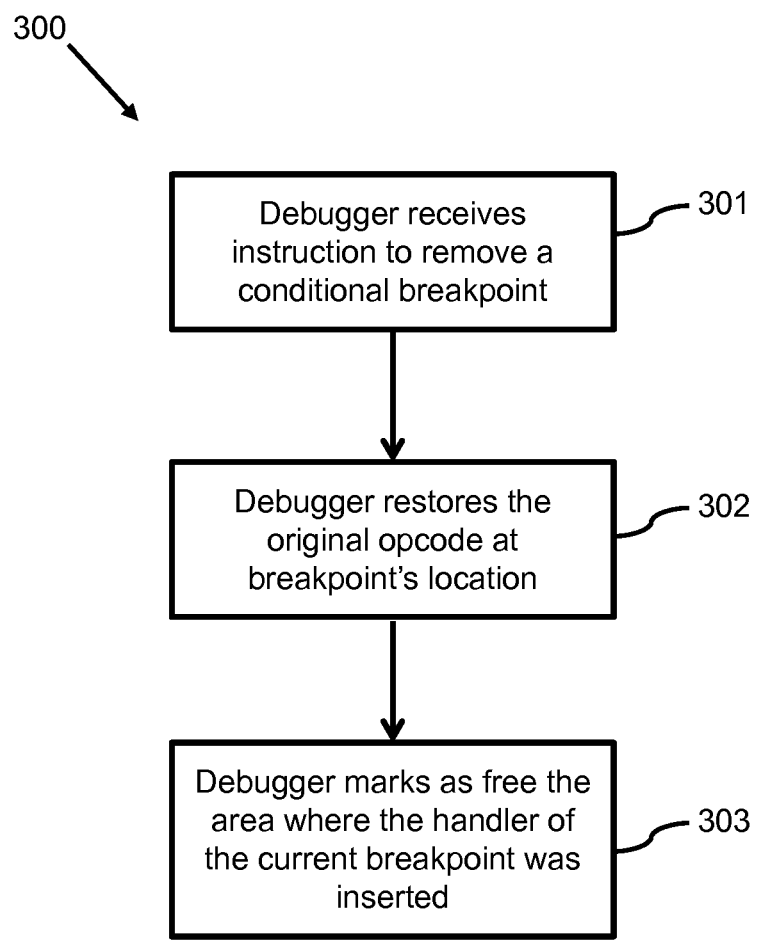
FIG. 4 shows a flow chart of part of an example of a method to remove a conditional breakpoint.

In an embodiment, the method of debugging also comprises removing a conditional breakpoint. FIG. 4 shows a flow of an example of a part of such a method. First, as represented by ref. number, 301, the user will remove the conditional breakpoint using the debugger program. The debugger program will restore the original opcode at the location of the breakpoint, see ref. number 302. Next, as represented by ref. number 303, the debugger program will mark as free the area where the BP handling routine of the current breakpoint was inserted, i.e. free the memory space used by the code block 202.

Figure 5:
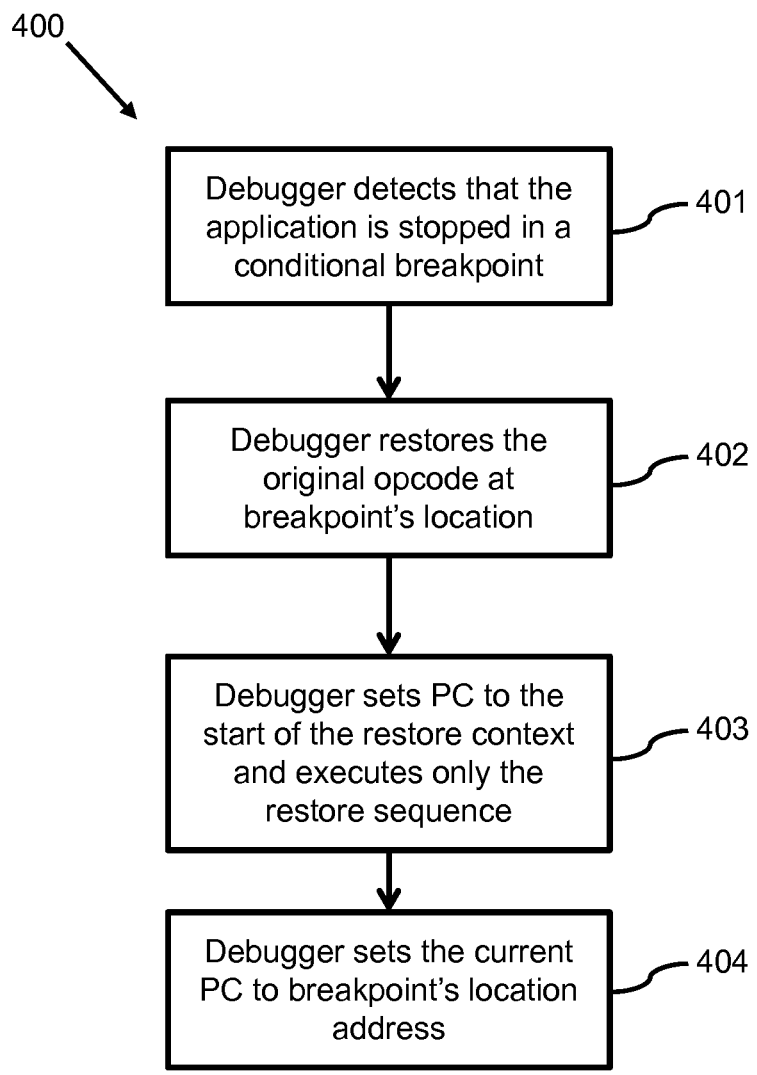
FIG. 5 shows a flow chart of part of an example of a method performed by the debugger program according to an embodiment in case a condition of the conditional breakpoint is hit.

FIG. 5 shows a flow chart of part of a method performed by the debugger program according to an embodiment. In this embodiment, the debugger program is arranged to detect that the target program has stopped in a conditional breakpoint, see ref. number 401. The debugger program will now restore the original opcode at the address 203 of the breakpoint, see ref. number 402. In a next ref. number 403, the debugger program sets the program counter (PC) to the start of the context restore code 209, using the offset 210 provided by the compiler program. The debugger program will then resume the target program and allows the target program to execute only the context restore sequence 209. Once the restore context code 209 is executed, the debugger program sets the PC to the address 203 of the breakpoint. It is noted that the code blocks 215 and 216 are not executed in this case, which is emphasised by the dashed borders of the code blocks 215 and 216. The code blocks 215 and 216 will be executed in the situation when the breakpoint is not hit.

By restoring the opcode at the address 203 of the breakpoint and by setting the PC to the address 203 of the breakpoint after a conditional breakpoint was hit, the debugger program will make the breakpoint handling routine invisible for the user. The debugger program will let the user take control before the execution of the original opcode. The breakpoint must be temporary disabled so that it will not to be taken again.

Figure 6:
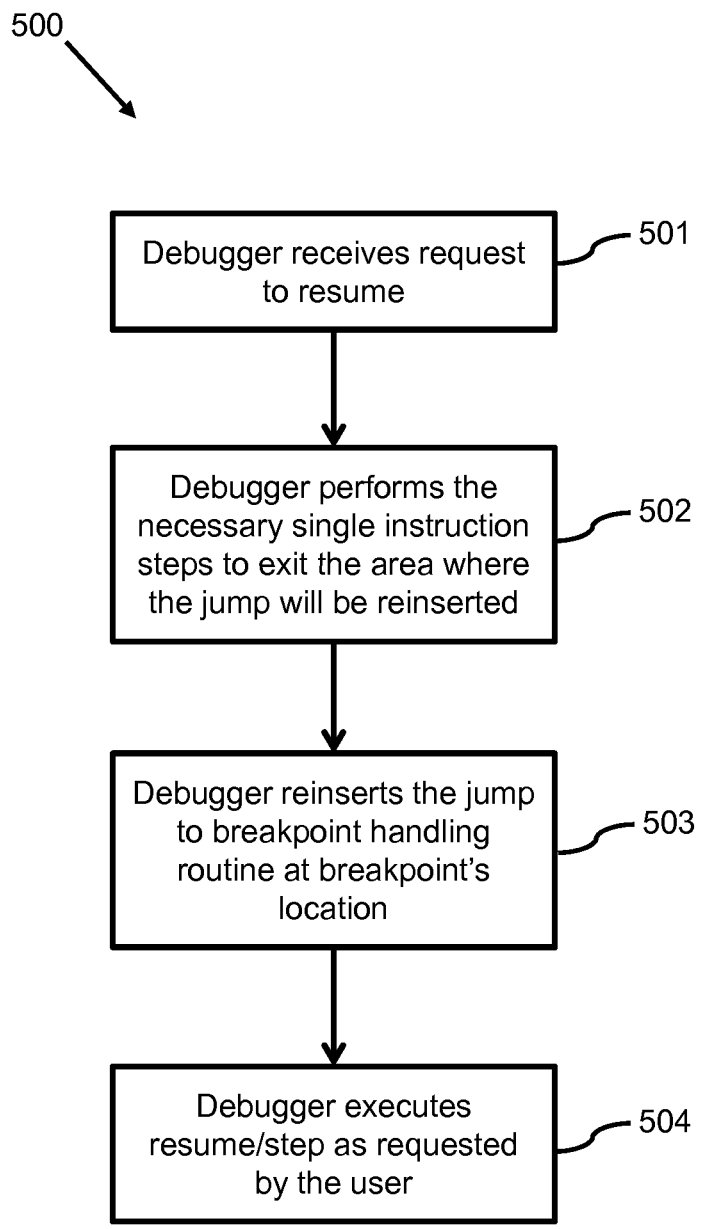
FIG. 6 shows a flow chart of some parts of an example of a method which may be performed when operation is resumed after a conditional breakpoint was hit.

FIG. 6 shows a flow chart of some parts of a method which may be performed when operation is resumed after a conditional breakpoint was hit. First the debugger program receives a request to resume the execution after a conditional breakpoint was hit, see ref. number 501. The debugger program will then perform the necessary single instruction steps until instruction n+k so as to exit the area where the jump to the BP handling routine will be reinserted, see ref. number 502. The debugger program will then reinsert (or 'reinject') the jump to breakpoint handling routine at the address 203 of the breakpoint, see 503, and the debugger program will resume the target program, see 504. Reinsertion of the jump is needed because the breakpoint was temporary disabled when conditional breakpoint was hit (see ref. number 402 in FIG. 5).

Figure 7:
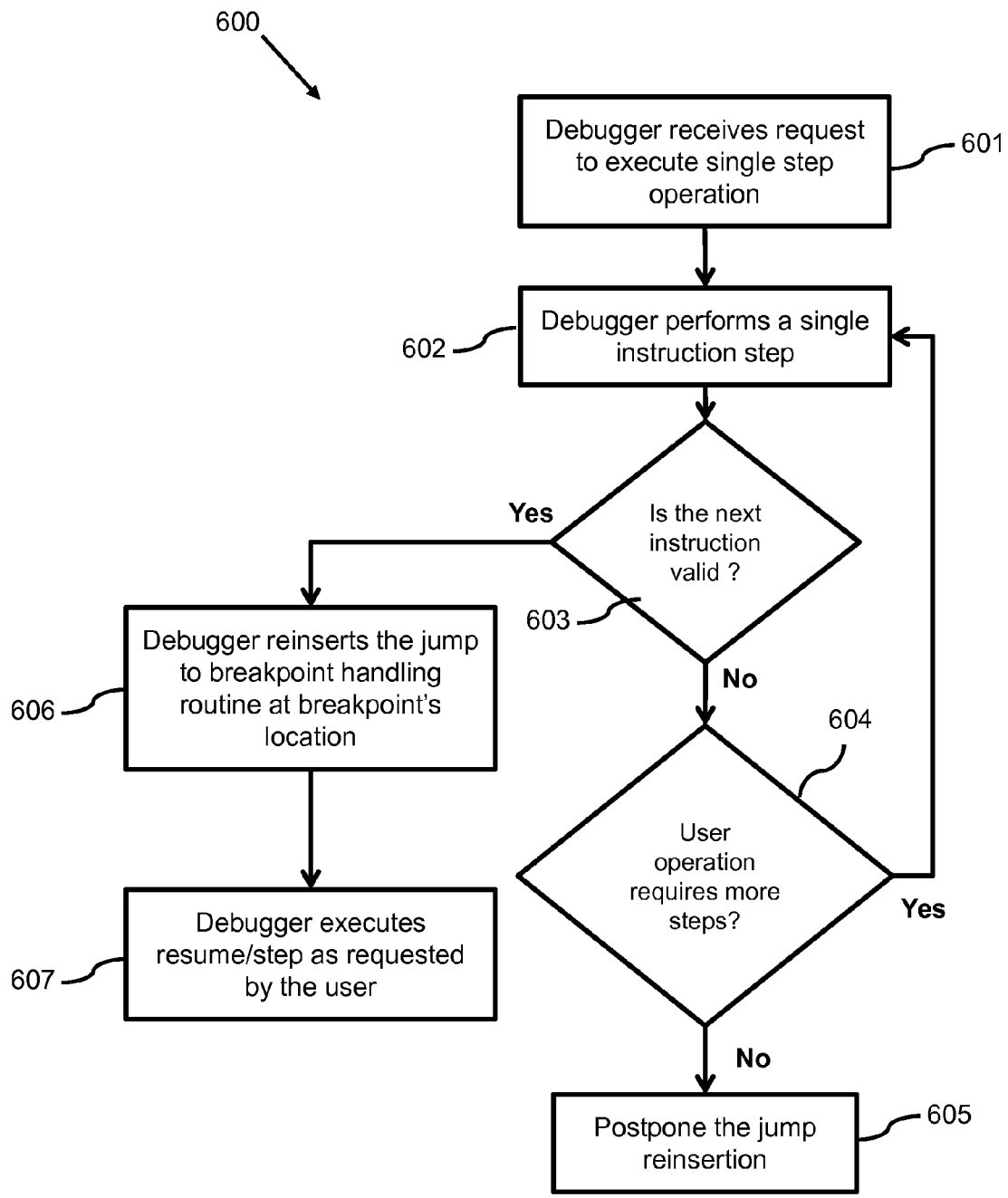
FIG. 7 shows a flow chart of a further part of an example of a method performed by the debugger program according to an embodiment in case a step operation needs to be performed after a conditional breakpoint was hit.

FIG. 7 shows a flow chart of a further part of a method performed by the debugger program according to an embodiment in case a step operation needs to be performed after a conditional breakpoint was hit. This method part starts with the debugger program receiving a request to execute a step operation after a conditional breakpoint was hit, see 601. The debugger program will then perform a single instruction step, see ref. number 602. The debugger program checks the current PC to see if it is the address of the next valid instruction, see ref. number 603. If it isn't the next valid instruction, a further test 604 is performed testing if the requested operation requires more steps. If this is the case, the method returns to ref. number 602. If the user does not require more single instruction steps, the jump reinsertion is postponed to next resume or step operations. In other words: the jump reinsertion is postponed until the core (i.e.

the target program) will be set in run mode, because the core is in debug mode at 605, see 605, and the algorithm stops.

If the next instruction is valid (i.e. result of test 603 is YES), the debugger program reinserts the jump to breakpoint handling routine at breakpoint's location 203, see ref. number 606 and the debugger program executes resume or step operations as requested by the user, see 607.

Figure 8:
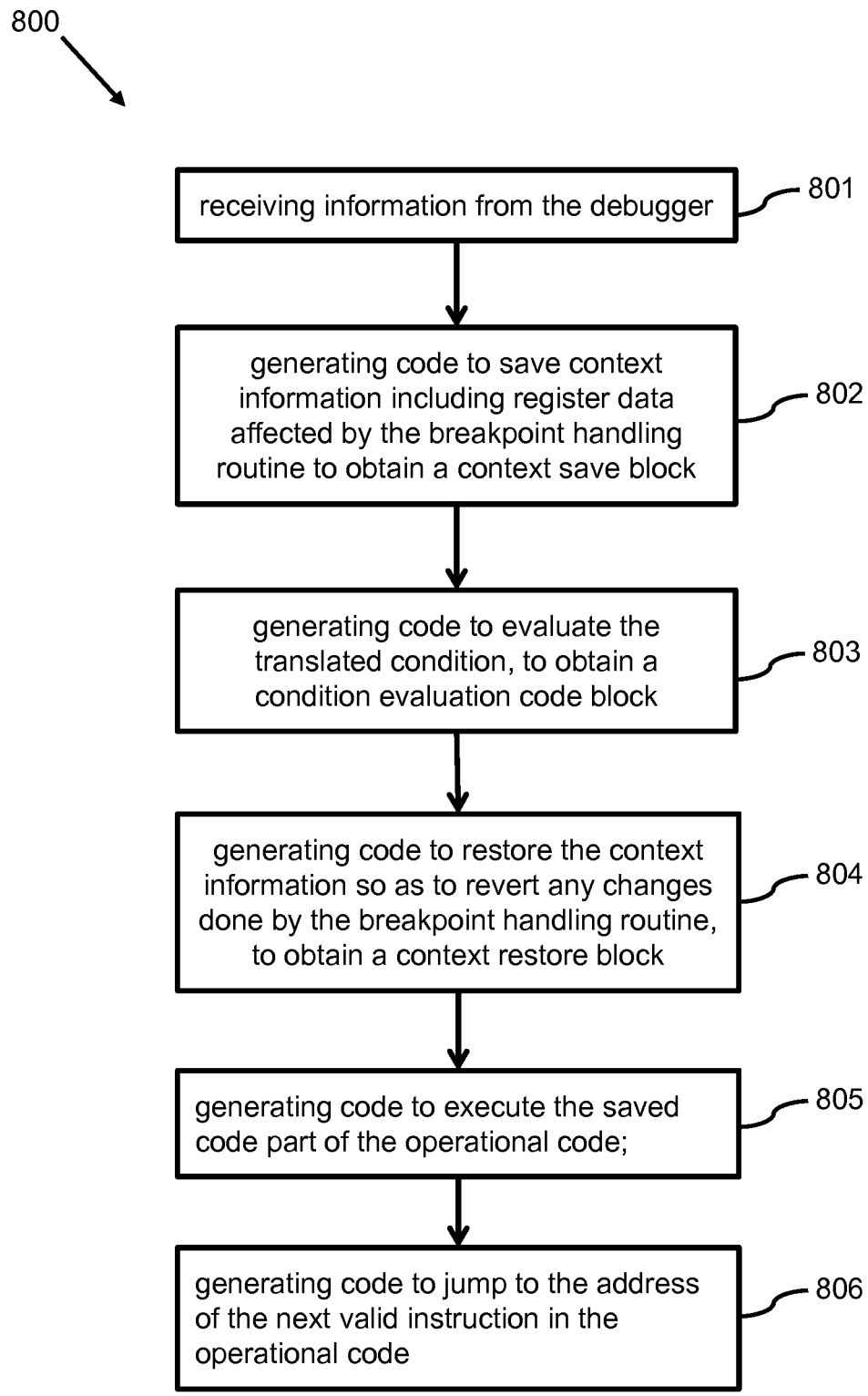
FIG. 8 is a flow chart of parts of an example of a method performed by the compiler program to generate the code pieces for the BP handling routine according to an embodiment.

According to an aspect, there is provided a compiler program arranged to to generate the code pieces for the BP handling routine as described above. In an embodiment the compiler program is arranged for receiving information from the debugger program, see ref. number 801 in FIG. 8. The information comprises the address 203 of the breakpoint, the address 204 of the next valid instruction, the saved code part of the operational code and the translated condition. The compiler program will then generate, see 802, code to save context information including register data affected by the breakpoint handling routine to obtain the context save block 205. Thereafter, see ref. number 803, code to evaluate the translated condition is generated to obtain a condition evaluation code block 206. This is followed by generating, see 804, code to restore the context information so as to revert any changes done by the breakpoint handling routine, to obtain the context restore block 209. Thus may be followed by generating, see 805, code (i.e. block 215) to execute the saved code part of the operational code. At the end of this example, as illustrated with ref. number 806, code is generated, see block 216, to jump to the address of the next valid instruction in the operational code 201.

FIG. 9 schematically shows an example of a microprocessor system 2000 having a microprocessor 2005. The microprocessor system 2000 is shown to be a personal computer, but may be any type of suitable microprocessor system 2000, such as mainframes, minicomputers, servers, workstations, personal computers, notepads, personal digital assistants, electronic games, automotive and other embedded systems, cell phones and various other wireless devices. A typical microprocessor system includes at least one processing unit, associated memory and a number of input/output (I/O) devices. A microprocessor system processes information according to a program and produces resultant output information via I/O devices. The computer program is typically stored internally on computer readable storage medium or transmitted to the microprocessor system via a computer readable transmission medium. A computer process typically includes an executing (running) program or portion of a program, current program values and state information, and the resources used by the operating system to manage the execution of the process.

The microprocessor may perform parts of the methods described above (i.e. by executing corresponding instructions). The microprocessor system 2000 further comprises a storage unit 2007, a user input 2003 and a display 2006. The user input 2003 allows the user to input user data and user instructions 2004 to the microprocessor 2005 by e.g. using a keyboard 2001 or a mouse 2002. Also, although not shown, the display 2006 may comprise a touch-sensitive surface for enabling the user to provide user data and user instructions to the user input 2003 by means of touching the display 2006. The microprocessor 2005 is arranged to perform any one of the methods according to the invention, to receive user data and user instructions 2004, to present visual information on the display 2006 and to communicate with a data I/O device 2009, such as an optical disc drive or a solid state reader/writer. The microprocessor 2005 is arranged to cooperate with the storage unit 2007, allowing storing and retrieving information on the storage unit 2007.

The microprocessor system 2000 may further comprise a communication channel 2008 allowing the microprocessor 2005 to connect to an external cloud 2500 for communicating with other devices in the cloud. The external cloud may e.g. be the Internet. The microprocessor system 2000 may allow input of the conditional breakpoint by a user. The microprocessor 2005 may be capable to read, using the data I/O device 2009, a computer readable medium comprising a program code. The microprocessor 2005 may be capable to read, using the data I/O device 2007, a computer readable medium comprising a computer program product comprising instructions for causing the microprocessor system 2000 to perform a method of the embodiments described above. However, any other suitable embodiment is conceivable as well.

According to a further aspect there is provided a computer program product for running on a microprocessor system, at least including code portions for performing actions of a method according to the invention when run on a microprocessor system (such as a system using a general purpose microprocessor, an embedded system using e.g. a microcontroller or a digital signal processor or otherwise) or to perform functions of a device or system according to the invention. The computer program may be provided on a computer readable media, such as a CD-rom or diskette, stored with data loadable in a memory of a microprocessor system, the data representing the computer program. The computer readable media may be tangible, and non-transitory and e.g. include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc. The computer readable media may further be transitory and e.g. be carrier wave transmission media.

Figure 10:
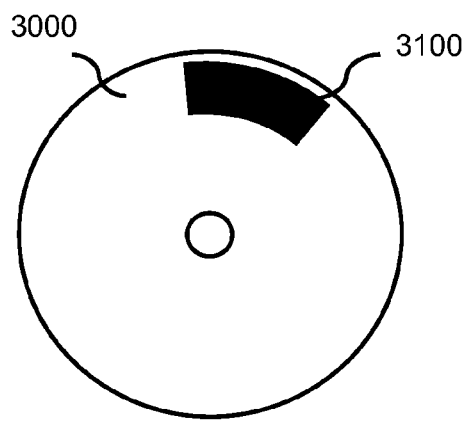
FIGS. 10-11 show an example of a computer readable medium comprising a computer program.
Figure 11:
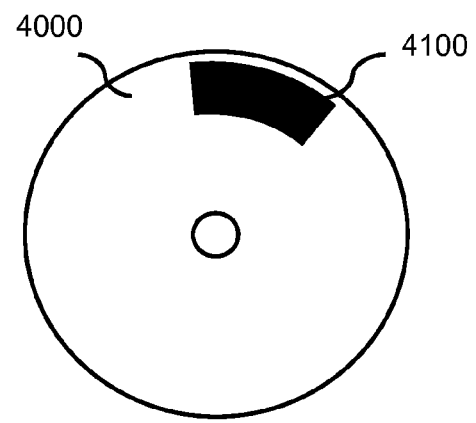

The computer program product may be embodied as instructions 3100 executable by a microprocessor, either as directly machine-readable or convertible into machine-readable code, on a computer readable medium 3000, see FIG. 10. According to yet a further aspect there is provided a computer program product comprising instructions for causing a microprocessor system to perform a method of generating code as described above. The computer program product 4100 may be embodied as instructions 4100 executable by a microprocessor, either as directly machine-readable or convertible into machine-readable code, on a computer readable medium 3000, see FIG. 10. on a computer readable medium 4000, see FIG. 11, as physical marks or by means of magnetization of the computer readable medium 4000. However, any other suitable embodiment is conceivable as well. Furthermore, it will be appreciated that, although the computer readable media 3000 and 4000 are shown in FIGS. 10 and 11 as an optical disc, the computer readable media 3000, 4000 may be any suitable computer readable medium, such as a hard disk, solid state memory, flash memory, etc., and may be non-recordable or recordable.

Some of the above embodiments, as applicable, may be implemented using a variety of different information processing systems. For example, although FIG. 1 and the discussion thereof describe an example of information processing architecture, this example of an architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. An embodiment relating to a computer program product comprises computer executable instructions corresponding to each of the processing actions of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

As was described above, the debugger program injects a jump to a breakpoint handling routine, the code of which is generated by the compiler program. Thus, conditional breakpoints may be handled without interrupting target program's execution. The condition will be inserted in the target program in order to be evaluated at execution time. This allows letting the debugger program use the compiler program to generate the code necessary for the evaluation of breakpoint condition in the code of the target program and the condition to be evaluated at runtime.

In the foregoing specification, the invention has been described with reference to specific examples of embodiments of the invention. It will, however, be evident that various modifications and changes may be made therein without departing from the broader scope of the invention, as set forth in the appended claims, and that the claims are not limited to the examples described above.

For example, the connections may be any type of connection suitable to transfer signals from or to the respective nodes, units or devices, for example via intermediate devices. Accordingly, unless implied or stated otherwise the connections may for example be direct connections or indirect connections.

Furthermore, it will be appreciated that, although the computer readable medium 2000 is shown in FIG. 9 as an optical disc, the computer readable medium 2000 may be any suitable computer readable medium, such as a hard disk, solid state memory, flash memory, etc., and may be non-recordable or recordable.

In the claims, any reference signs placed between parentheses shall not be construed as limiting the claim. The word 'comprising' does not exclude the presence of other elements or actions then those listed in a claim. Furthermore, Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method of debugging operational code of a target program, where a jump to an breakpoint handling routine is injected into the operational code, the method comprising:
   receiving a command to set a conditional breakpoint, the command comprising a breakpoint position and a condition;
   computing an address of the breakpoint and an address of a next valid instruction within the operational code, the next valid instruction being the first next instruction not affected by the injection of the jump to the breakpoint handling routine;
   saving a part of the operational code starting from the address of the breakpoint until the address of the next valid instruction, to obtain a saved code part;
   translating the condition into a compiler program language to obtain a translated condition;
   calling a compiler program with information comprising the address of the breakpoint, the address of the next valid instruction, the saved code part and the translated condition, to let the compiler program create code pieces for a breakpoint handling routine, the code pieces comprising:
      a context save block comprising instructions to temporarily save context data;
      a condition evaluation code block comprising instructions to evaluate the condition that the debugger program received;
      a context restore block comprising instructions to restore the context data;
      the translated opcode, and
      a jump to the next valid instruction;
   the method further comprising:
   receiving the code pieces and one or more debugger program hooks from the compiler program;
   computing a routine memory address where the breakpoint handling routine will be inserted;
   inserting the breakpoint handling routine at the routine memory address, and
   injecting the jump to the breakpoint handling routine into the operational code at the address of the breakpoint.

2. A method of debugging operational code according to claim 1, the method further comprising:
   checking the validity of the condition;
   stopping the method if the condition is found to be invalid;
   reporting, for example to a user, that the condition is invalid.

3. A method of debugging operational code according to claim 1, the method further comprising:
   receiving an instruction to remove the conditional breakpoint;
   restoring the saved code part at the address of the breakpoint;
   marking as free an area of the program memory where the breakpoint handling routine was inserted.

4. A method of debugging operational code according to claim 1, wherein the debugger program hooks comprise an offset and size of the context restore block within the breakpoint handling routine, the method further comprising:
  detecting that the conditional breakpoint is hit, and putting the target program in debug mode;
  restoring the saved code part at the address of the breakpoint;
  setting a program counter to the start of the context restore block using the offset;
  performing single instruction steps in debug mode until the program counter gets to an end of the context restore block;
  setting the program counter to the address of the breakpoint.

5. A method of debugging operational code according to claim 1, the method further comprising:
  receiving a request to resume execution of the target program after the conditional breakpoint was hit;
  performing one or more single instruction steps to exit the memory area where the jump will be reinserted;
  reinserting the jump to breakpoint handling routine at the address of the breakpoint, and
  resuming the target program.

6. A method of debugging operational code according to claim 1, the method further comprising:
  receiving a request to execute step operation;
  performing a single step operation;
  if a next instruction is valid: reinserting the jump to breakpoint handling routine at the address of the breakpoint, and executing the step as requested;
  if the next instruction is not valid and if user operation requires more steps: return to the action of performing a single step operation.

7. A method of generating code for a breakpoint handling routine, the method comprising:
  receiving information from a debugger program, the information comprising an address of a breakpoint, an address of a next valid instruction, a saved code part of an operational code and a translated condition;
  generating code to save context information including register data affected by the breakpoint handling routine to obtain a context save block;
  generating code to evaluate the translated condition, to obtain a condition evaluation code block;
  generating code to restore the context information so as to revert any changes done by the breakpoint handling routine, to obtain a context restore block;
  generating code to execute the saved code part of the operational code;
  generating code to jump to the address of the next valid instruction in the operational code.

8. A method of generating code according to claim 7, the method further comprising:
  computing an offset and a size of the context restore block;
  computing an offset of a first instruction within the condition evaluation code block that is to be executed if the translated condition is met;
  sending the offset and the size of the context restore instruction block to the debugger program;
  sending the offset of the first instruction to the debugger program.

9. An apparatus for debugging operational code of a target program, the apparatus comprising:
  a memory storing the operational code and a set of instructions representing a debugger program for debugging the operational code;
  a microprocessor configured to execute the operational code and the debugger program;
  the debugger program being arranged to inject a jump to a breakpoint handling routine into the operational code, the debugger program being arranged for:
    receiving a command to set a conditional breakpoint, the command comprising a breakpoint position and a condition;
    computing an address of the breakpoint and an address of a next valid instruction within the operational code, the next valid instruction being the first next instruction not affected by the injection of the jump to the breakpoint handling routine;
    saving a part of the operational code starting from the address of the breakpoint until the address of the next valid instruction, to obtain a saved code part;
    translating the condition into a compiler program language to obtain a translated condition;
    calling a compiler program with information comprising the address of the breakpoint, the address of the next valid instruction, the saved code part and the translated condition, to let the compiler program create code pieces for a breakpoint handling routine, the code pieces comprising:
      a context save block comprising instructions to temporarily save context data;
      a condition evaluation code block comprising instructions to evaluate the condition that the debugger program received;
      a context restore block comprising instructions to restore the context data;
      the translated opcode, and
      a jump to the next valid instruction;
    the debugger program further being arranged for:
    receiving the code pieces and one or more debugger program hooks from the compiler program;
    computing a routine memory address where the breakpoint handling routine will be inserted;
    inserting the breakpoint handling routine at the routine memory address, and
    injecting the jump to the breakpoint handling routine into the operational code at the address of the breakpoint.

10. An apparatus for generating code for a breakpoint handling routine, comprising:
  a memory storing a set of instructions representing a compiler program;
  a microprocessor configured to execute the compiler program;
  an interface for receiving information from a debugger program
  the compiler program being arranged for:
  receiving information from the debugger program comprising an address of a breakpoint, an address of a next valid instruction, a saved code part of an operational code and a translated condition;
  generating code to save context information including register data affected by the breakpoint handling routine to obtain a context save block;
  generating code to evaluate the translated condition, to obtain a condition evaluation code block;
  generating code to restore the context information so as to revert any changes done by the breakpoint handling routine, to obtain a context restore block;

generating code to execute the saved code part of the operational code;

generating code to jump to the address of the next valid instruction in the operational code.

11. A computer program product stored in a tangible, non-transitory computer readable medium comprising executable instructions for causing a microprocessor system to perform a method according to claim 1.

* * * * *